Figure 1:
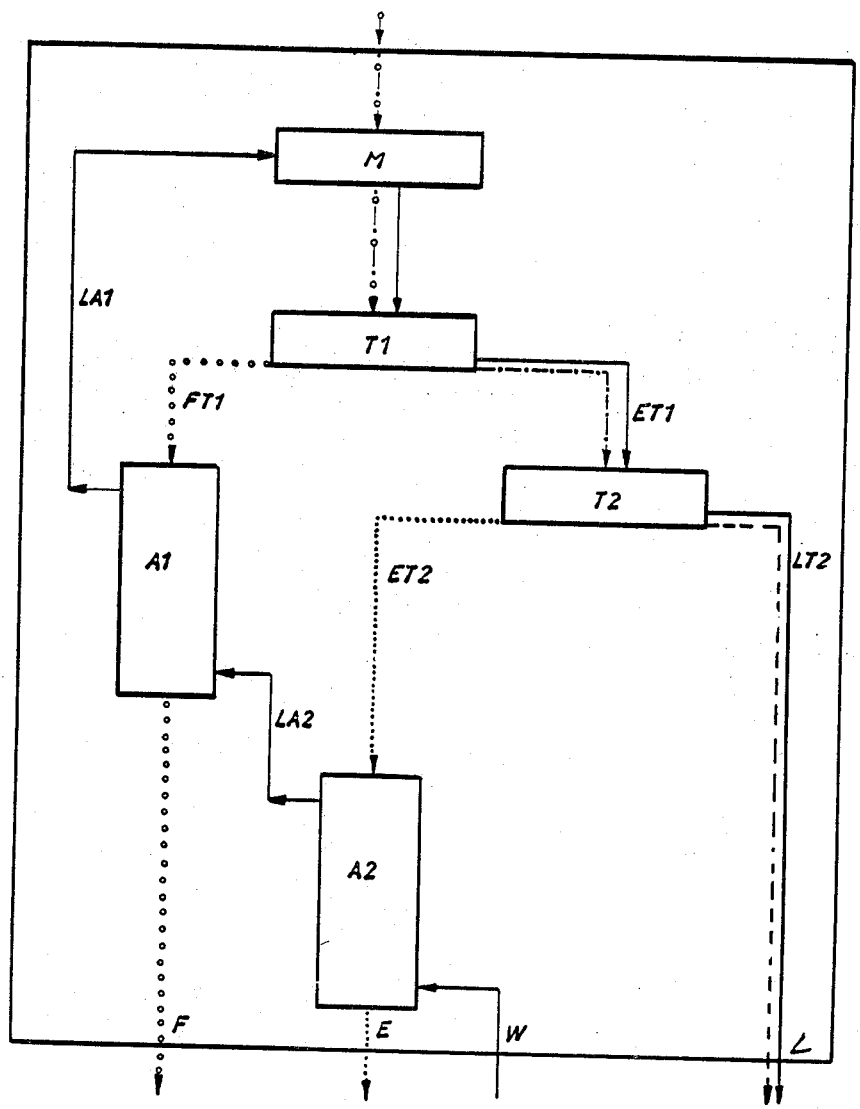

○ ○ ○ ○ ○ ○ ○ Path of fibers (F)
············ Path of protein (E)
------ Path of solubles (L)

—·—·—·—· Path of starting materials
———— Path of wash water
—·—·—·—· Path of protein emulsion Inventor:
HELMUT BOCK
By Burgess, Dinklage & Sprung United States Patent Office 3,402,165
Patented Sept. 17, 1968

3,402,165
METHOD FOR PROCESSING OIL MILL RESIDUES TO RECOVER HIGHLY PURIFIED PROTEIN
Helmut Bock, Krefeld, Germany, assignor to Protein-Compagnie G.m.b.H., Zug, Switzerland, a corporation
Filed May 14, 1962, Ser. No. 194,341
Claims priority, application Germany, May 17, 1961, B 62,505
10 Claims. (Cl. 260—123.5)

This invention relates to a method for processing oil mill residues. In one aspect, it relates to a process for producing high yields of high purity protein.

Seeds containing oil are processed for recovery of the oil by various methods as, for example, by extracting the seeds with solvents or by pressing the seeds at high pressure to thereby squeeze out the oil, etc. As a result of treatment by these methods there are recovered crude oils and the so-called oil mill residues, the latter being further designated as meals, oil-cakes and expellers. The aforesaid products are commonly employed as foodstuffs and can be used directly for that purpose or as components of a mixed foodstuff. In certain areas of the world the oil seeds themselves are utilized as foodstuffs; however, in European countries and in the United States, such use has not prevailed.

The meals of various origin, such as, for example, soybean meal and peanut-meal, are characterized by a very high protein content, soybean-meal having a protein content of about 45% and peanut-meal a protein content of up to 50%. In view of the scarcity of protein required for human nutrition all over the world, and further the recently acquired knowledge as to the insufficient protein in the average diet which, because of the high costs involved, may not be eliminated by prescribing more meat, many attempts have been undertaken in an effort in the past years to make the protein derived from oil seeds suitable for human nutrition. However, the methods available heretofore did not result in the production of protein from the oil mill residues suitable for human nutrition where the methods were suitable for commercial use. The protein fractions derived for example from soybeans or peanuts and/or their meals, because of the high price thereof, were only utilized for special purposes, this being particularly true in connection with technical applications.

The main reason for the high working costs is directly attributable to the fact that in the known processes the soluble constituents form solutions containing about 1% of dry substance, which solutions cannot be economically further worked-up, and which therefore must be discarded. Furthermore, as a result of the use of alkalis as solving agent, the soluble components, and in particular the sugar, are denatured, so that the same are not suitable for application, for example in connection with animal feeds.

It is therefore an object of this invention to provide a new and improved method for treating oil mill residues for producing high yields of protein.

It is a further object of this invention to provide a new and improved method for treating oil mill residues for producing high yields of protein of a purity suitable for use as a foodstuff.

It is a still further object of this invention to provide a new and improved method for treating oil mill residues for producing high yields of a soluble fraction suitable for use as an animal feed.

Another object of the invention is to provide a new and improved commercially feasible method for producing high yields of protein of a purity suitable for use as a foodstuff.

Other objects will be apparent from the description and claims which follow.

These and other objects are attained by means of this invention wherein it was found that oil-seed-meals can be broken down in a commercially utilizable manner into a protein fraction, a soluble component fraction and into fibers by treating an oil-seed-meal water mixture admixed in a ratio of oil-seed-meal to water of 1:1.5 to 1:20 and preferably of 1:3 to 1:8 by the following steps carried out in a closed circulation:

(1) Mashing the starting meal-water mixture by contacting the same with a solution-suspension LA1, which contains, in addition to dissolved substances, insoluble protein, (2) Breaking down the mash in a fiber-separation T1 into a fiber fraction FT1 and a protein emulsion fraction ET1, (3) Breaking down the protein emulsion fraction in a protein separation T2 into a protein-concentrate ET2 and a solution LT2, (4) Possibly discharging the solution LT2 after evaporation thereof from the circulation, (5) Washing the protein concentrate ET2 in a protein washing A2 by passing the protein concentrate in counter-current to fresh water W, introduced into the circulation from without, to thereby form the solution LA2 and the protein fraction E, (6) Separating the protein fraction E and discharging it from the system, (7) Washing the fiber material FT1, obtained in the fiber separation T1, in a fiber-washing-out A1, by-passing the same in counter-current to the solution LA2, whereby the solution-suspension LA1 and the fiber fraction F are formed, (8) Separating the fiber fraction F and discharging the same from the system, (9) Returning the solution-suspension LA1 for use in the mashing of further starting material.

Figure 2:
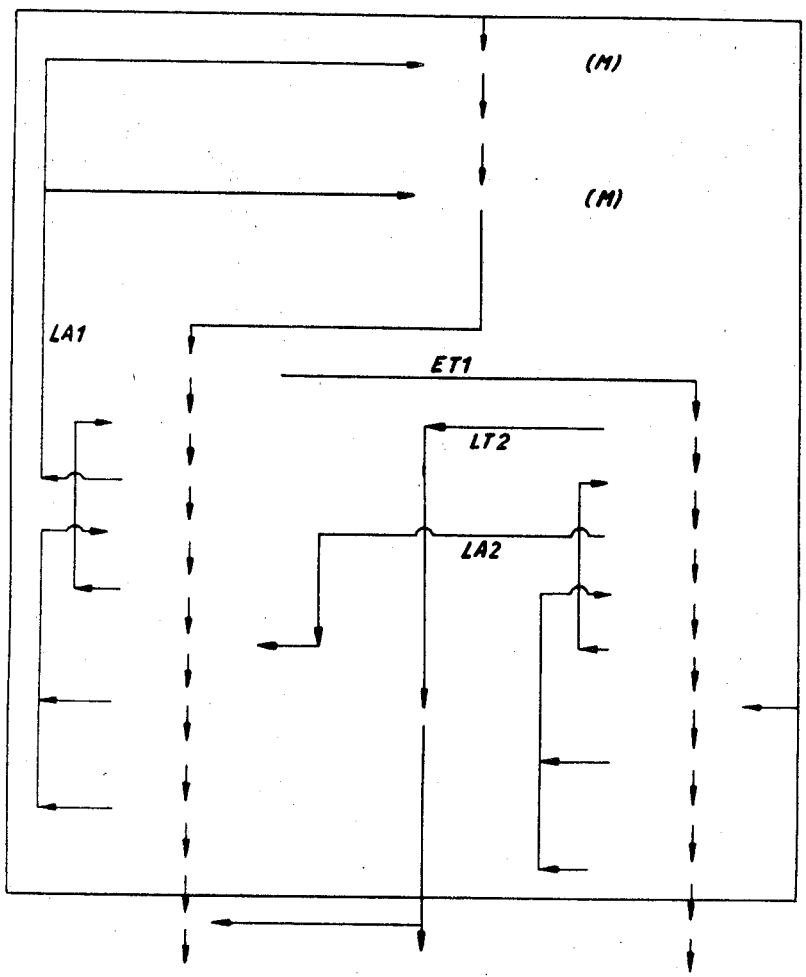

A better understanding of the invention may be obtained by referring to the drawing, in which FIG. 1 is a flow diagram illustrating one preferred embodiment of the invention; and FIG. 2 is a flow diagram illustrating another preferred embodiment of the invention.

In the disclosure and the drawing, the following symbols having the meanings indicated below have been employed:

M=mash
T1=fiber separation step
FT1=fiber fraction recovered from the fiber separation step
ET1=protein emulsion fraction recovered from the fiber separation step
T2=protein separation step
ET2=protein concentrate recovered from the protein separation step
LT2=solution of soluble components recovered from the protein separation step
A1=fiber-washing step
F=fibers recovered from the fiber-washing step
LA1=solution-suspension recovered from the fiber-washing step
A2=protein-washing step
E=protein
LA2=solution recovered from the protein-washing step
L=soluble fraction The process according to the invention is carried out within a completely closed and continuous system. The starting material and water admixed in a specific ratio are introduced into the system. The amount of solution which is drawn off from the system depends on the amount of fresh water W, which is added for washing the protein, and on the water content of the protein and fiber materials which are taken out of the system (water lost to the system). Thus, in accordance with the invention, a proper and critical relationship exists and must be maintained between the fresh water introduced into the system and the starting material; maintaining the relationship being dependent on insuring that the amount of water present in the system is a constant.

In place of the solution-suspension LA1, which contains large quantities of undissolved protein, there may be conveniently used for the mashing the solution LT2 or a mixture of both solutions LA1 and LT2. In this case, the solution-suspension LA1 or the residue (unused portion) of the same is prior to or after the fiber separation step T1 added to the protein emulsion fraction ET1.

In accordance with the invention, the mash, after having been possibly subjected to, for example, swelling, vacuum drying and grinding treatment steps, as described hereinafter, is conducted to the fiber separation T1. In the fiber separation T1 the fiber material FT1 is separated from the aqueous phase of the protein-emulsion fraction ET1, which contains the protein and soluble constituents, through screening, centrifuging or coarse-filtration, or a combination of such processes.

The fiber separation may take place in one step. However, it is also possible to carry out the fiber separation in two steps, in the first of which the coarse fibers are separated and thereafter in a second step separating the fine fibers. Between the two separation steps, a grinding of the solid components remaining may be carried out. The sieves which are used for the separation are chosen so that as far as possible all of the fibers are retained on the sieve.

The separated fiber material FT1 is then passed to the fiber-washing step A1, and the protein-emulsion fraction ET2 is conducted to the protein-separation step T2.

The fiber-washing step is carried out as multi-stage operation and utilizes several separating machines, connected in series one behind the other. The separators used are constructed, for example, as curved sieves, slotted sieves, shaking screens, washing-apparatus and centrifugal screens. Depending on the arrangement of separating devices and the type selected, more or less washing steps are required and the fiber-washing may be carried out in from 2 to 10 steps and possibly more. Where curved sieves and shaking screens are utilized, the washing step is preferably carried out in from 6–10 steps. In the cases where centrifugal screens and washing-apparatus are utilized, the fibers are separated having a relatively slight moisture content and there may accordingly be used half the usual number, or even less washing steps than otherwise required.

The fiber separation T1 and the fiber-washing A1 may be carried out with the material being treated having a pH varying over a wide range, i.e., ranging from pH 3–7. Most advantageously, the fiber separation is carried out in an acid medium of pH 4.3–5.0, in that as a rule there is utilized in connection with a disinfecting treatment of the material being processed sulfurous acid. The protein-separation T2 and protein-washing A2 are carried out at the iso-electric point of the protein, and preferably at a pH of 4.7.

In carrying out the protein-separation T2, which serves to separate the protein-emulsion fraction into a protein-concentrate and an aqueous solution containing the soluble components, there may be used for example settling-tanks, separators, centrifuges or concentrating apparatus. There is obtained in the protein separation T2 a concentrated protein-emulsion fraction ET2, which may contain about 200–300 g. of protein per liter, and an aqueous solution LT2. The separation T2 is carried out so that the aqueous solution as far as is possible no longer contains any insoluble protein. In the separation (T2) it is also possible to work in two stages, by further clarifying the separated aqueous solution having a certain protein content in a second step and then drawing-off the aqueous solution LT2 and adding the protein concentrate recovered to the protein concentrate stream ET2.

If the solution LT2 is to be used in connection with a fermentation process, then an evaporation step is superfluous, and the solution LT2 may be used directly as raw material therefor. However, if the soluble components are to be used as feed or are to be shipped prior to use, then it is advantageous to concentrate the solution LT2 in multi-step-evaporators regulated so that the solution remains only for a short period in the evaporator, as for example in a rotation-evaporator, a gravity-flow evaporator or a thin-layer evaporator.

The protein-emulsion fraction ET2 is passed to the protein-washing A2. This step serves for the purification of the protein. The protein washing is carried out under addition of fresh water which is passed in counter-current to the flow of protein through several washing steps, where through alternating concentration and dilution the washing takes place, the fresh water being introduced prior to the last washing stage. The washing water separated is used in each case in the preceding stage for the dilution, so that it washes the protein in counter-current flow. The number of the washing stages depends on the type of apparatus used therefor. If, for example, separators are used, then three to four steps are required in order to obtain a sufficiently pure material.

The washed protein E is removed directly from the process, but may be concentrated using therefor a completely jacketed sieve-centrifuge or filter-press, in connection with which a washing of the protein may be carried out. The washing-water herein used then forms a part of the added fresh water and is introduced as wash water for the washing carried out in A2.

The fresh water passing in counter-current flow to the protein in the protein-washing A2 takes up soluble constituents, and it is thereafter used for washing the fiber-material in the fiber-washing step A1. The fiber-washing A1 may be carried out in an apparatus consisting of, for example, several series-connected washing apparatus, shaking-screens, curved-sieves or sieve-centrifuges. In this connection the number of the steps required depends on the type of the individual pieces of equipment used and also industrial efficiency of the process.

The washed-fibers F are dehydrated by means of presses or sieve-centrifuges and conveyed to the drier. The resulting solution-suspension LA1, which has been enriched in the course of the washing-process with soluble constituents, and considerable quantities of protein amounting to, for example, up to 30–50 g. per l., is thereafter used for the mashing of the starting material.

The mashing of the starting material is carried out using varying ratios of starting material to solution. If the material is to be further broken down after the mashing step as by grinding carried out in a pin or disc, as for example corundum-disc-mill, ratio of 1:3–1:7 (starting material:solution) is utilized, and there is then added prior to the fiber-separation T1 a further quantity of solution-suspension LA1, in order to facilitate the work of the fiber-separation T1. However, there may be used for the mashing, the solution LT2 or an admixture of the solution-suspension LA1 and the solution LT2. Under these circumstances the unused solution suspension LA1 is added to the aqueous phase ET1 from the fiber-separation T1.

In order to better separate the individual substances one from the other, it may be appropriate, according to the type and purity of the desired end-products, to treat the materials so as to produce a certain swelling or lactic-acid-fermentation. To this end there is added to the material being treated an acid, preferably sulfurous acid, and the mesh permitted to swell for up to 48 hours at a moderate temperature of about 45–55° C. The lactic-acid-fermentation which takes place serves to separate the individual substances one from the other and imparts to the mash a certain acidity.

The resulting acidity must in each case be adjusted so that in the fiber-separation T1 and in the protein-milk ET1 an optimal yield is obtained. The pH-value lies between 4 and 5 at the iso-electric point of the protein and, in most cases, is between 4.6 and 4.8. It has to be ascertained individually for each material and adjusted accordingly, and must be maintained during the washing-process, i.e., in protein-washing-out A2. In this connection, it is advantageous to adjust the pH of the fresh water to this value. There may be conveniently used for adjusting the pH any acid not imparting toxic properties to the resulting protein and soluble component, as for example, sulfuric acid, sulfurous acid, phosphoric acid, lactic acid, hydrochloric acid, citric acid, acetic acid, etc.

For separating the protein from the water it is in some cases advantageous to add to the fresh water an electrolyte as, for example, common salt (sodium chloride), Glauber's salt (sodium sulfate decahydrate), sodium-acetate and the like.

Before, during or after the protein-washing, the protein-emulsion may be further purified by separating the heavy constituents as for example sand, the coarse and small particles of shells, starch or dextrines, using therefor hydrocyclones or separators.

As mentioned, the starting material is initially mashed with the solution-suspension LA1 and/or the solution LT2. This mash may be ground directly or after first subjecting the same to a swelling. The grinding may be carried out with pin-mills or disc-mills, or roller-mills. Advantageously, care is taken so that the fibers are not shattered or broken up in the grinding, as the separation of fine fiber constituents from the protein is only accomplished with difficulty.

It is essential in the process to use as far as possible a sterile starting material, which may be conveniently obtained by using meals in aqueous solution which have been de-benzened under vacuum. For the de-benzening there is used the solution-suspension LA1 or the solution LT2 or a mixture of both rather than pure water. The entire process will generally be carried out as quickly as possible since then fermentation does not take place or only to a slight extent. The process may be carried out at low or elevated temperatures. If it is desired to recover a protein having a high solubility, then the working temperature selected should lie below 60°, and preferably between 50 and 55° C.

If the isolated protein is to be used for technical purposes, then the protein E is withdrawn in the form of a protein-emulsion from the process and made alkaline by bringing the pH up to a value of about 11. The protein is thereby dissolved and the undissolved constituents are removed by separation or filtration. The clear solution remaining is acidified and the protein is isolated by conventional methods and dried. In order to avoid fermentation during the process there are used bactericides, etc., as, for example, sulfurous acid, sodium bisulfite or acceptable antibiotics.

The starting materials which may be used include the oil-seed-meals, cakes and expellers, as, for example, soybean-meal, peanut-meal, palm-kernel-meal, peanut-expeller, soybean-expeller and cottonseed-expeller. The expellers and cakes are obtained by the continuous and/or discontinuous pressing of oil-seeds. The so-called meals are obtained by extraction of, for example, soybeans, nuts, cotton-seeds, palm-kernels and other oil-seeds with benzene or hexane, by the customary procedures. If fractions having high swelling capacity and solubility are desired, then the de-benzening of the meals must take place under mild conditions, so that the protein does not coagulate.

There may also be used solvent-moist rough grinds as starting material, in which case the removal of the solvent takes place by heat treatment carried out within the closed system used in accordance with the invention. By using vacuum and equipment, such as flow-evaporators, rotation-evaporators, or thin-layer evaporators, it is possible to carry out the evaporation-process quickly and carefully, so that no damage of the protein takes place and a highly soluble product results.

The following example serves to illustrate the invention but it is not intended to limit it thereto.

Example

In an installation of the type shown by flow diagram in FIG. 2 there are hourly processed 400 kg. of untoasted soybean meal having a protein content of 44.8%. The soybean meal is introduced in dry form into a rapid mixer wherein it is pre-mashed with LA1 and LT2. It is then conducted through a curved sieve having a slot with $150\mu$ which serves to separate the undecomposed coarse material from the protein and soluble components, following which the mash is conducted into a rapidly rotating pin-mill rotating at 5000 r.p.m., wherein the coarse material is further loosened up so that a fiber fraction and a protein fraction are formed. The fiber separation T1 is carried out in a curved sieve having a slot with $50\mu$ whereby the fibers are separated from the resulting emulsion containing the protein and soluble constituents. The fiber fraction T1 is passed into a supraton which breaks down the fiber material by means of supersonic oscillations without destroying the fiber structure per se. Such apparatus is used conventionally, for example in the paper and cellulose industry. The fiber fraction is introduced into a fiber washing arrangement A1 consisting of 6 curved sieves, serially-arranged, the sieves having slit widths of $150\mu$ wherein the fiber fraction is washed by being passed in counter-current flow contact with wash water which has been derived from the protein washing treatment. The fibers following the washing thereof are admitted into a sieve centrifuge wherein the water is extracted from the fibers, the reduction in water content amounting to from 90–66%.

The protein emulsion obtained in T1 is conducted into a protein separator arrangement T2 consisting of a centrifugal separator wherein the protein is separated from the main portion of the soluble components present in the aqueous emulsion. From the separator the protein fraction is passed into a washing arrangement A2 consisting of 3 centrifugal separators connected in series, in which arrangement the protein is further washed in counter-flow contact with washing agent utilizing alternating concentration and dilution. The wash protein is then passed into and through a suction filter which serves to separate the protein from the aqueous phase.

In accordance with the process of the invention there are introduced 400 kg. of soybean meal and 1800 l. of water into the closed system. The pH of the water is adjusted with sulfurous acid and dilute hydrochloric acid to a value of 4.5. The temperature is maintained at 40° C. The water which is introduced is calcium and magnesium cation-free. The water which is used constitutes water which was introduced at the end of the protein washing step A2, namely, into the terminal part of the washing arrangement for use in washing the protein fraction. The water is passed in counter-current flow through the washing arrangement A2 becoming enriched with soluble constituents. This enriched water is thereafter used for washing of the fiber constituents A1, which washing is also carried out by passing the fibers in counter-current flow contact with the water. The water is thereby further enriched with soluble components and simultaneously takes up any protein still adhering to the fibers following the fiber separation T1. The solution-suspension LA1 thereby formed is used for the mashing of the starting material which is continuously introduced into the installation.

There is added to the mixer 4000 l./hr. of solution LT2 in order to produce a convenient concentration for the further processing. The mash consisting of fibers, protein, soluble components, water and intact starting material is passed through a curved sieve in order to sift out the coarse material. The portion remaining on the sieve is ground further using therefor a pin-mill and thereafter added to the portion which is passed through the sieve, and the combined mash is conducted through a second curved sieve having a slit width of 50μ FT1. The protein emulsion which has passed through the sieve and which contains 38 g. protein per l. is introduced into a separator arrangement T2 and, as a result, a protein fraction is recovered having a content of 180 g. protein per l. The solution simultaneously recovered is free of any solid constituents and contains 11% of dissolved components. The said solution is withdrawn from the system in a quantity of 1360 l. per hr. 4000 l. of this withdrawn solution are utilized for mashing the raw material (supra). The fiber fraction which is recovered FT1 is subjected to a washing treatment utilizing the water recovered from the protein washing treatment A1 and the fibers following the washing are freed from any water in a sieve centrifuge and discharged from the system.

The protein emulsion which is recovered from the separator arrangement T2 and which contains 180 g. per l. of protein is washed, using the arrangement as above described. The protein fraction recovered from the last of the 3 separators is subjected to treatment in a suction filter and the filter-cake washed with 1800 l. of water having a temperature of 40° C. The water used for this washing has a pH value of 4.5 which pH has been obtained by addition of dilute hydrochloric acid to the water.

This water, which is introduced in an amount of 1800 l. at the end of the process for a final washing of the protein, is used for preliminary washing of the protein and thereafter as washing agent for the fibers. Finally, this water is introduced in its entirety 1800 l. for the in the mashing of the 400 kg. soybean-meal.

The analysis of the starting soybean-meal is as follows:

| | |
|---|---|
| Protein | 44.8 |
| Ash | 5.4 |
| Raw fiber | 7.0 |
| Oil | 0.2 |
| Carbohydrates | 29.6 |
| Water | 12.5 |

The following are the yields obtained in accordance with the invention when 400 kg. of the soybean product having the above analysis is subjected to the process in accordance with the invention:

| | Percent |
|---|---|
| Protein (159.2 kg.) | 39.8 |
| Fibers (98.4 kg.) | 24.6 |
| Soluble components (142.4 kg.) | 35.6 |

The protein which is recovered has purity of 90.7% calculated with respect to the dry product. When the above example was repeated using soybean-meal derived in the processing of de-hulled soybeans having a protein content of 51.3%, there was obtained a yield of 44.7% of protein.

The process in accordance with the invention is characterized by numerous advantages over processes known to the art. Among the advantages are the following:

(1) A 100% recovery of protein, fiber and soluble components;

(2) Economy of operation obtained by the high concentration of the soluble components;

(3) High yields of protein obtained by limiting the amount of water introduced into the system and by re-use of the water employed in the washing;

(4) Re-use of the wash-water, first, for washing the protein; secondly, for washing the fiber, and, thirdly, for mashing the starting material;

(5) Use of a portion of the wash-water for the mashing of the starting material and a portion for the dilution in the protein fiber separation T1.

I claim:
1. Process for treating oil seel mill residues to obtain therefrom a protein fraction, a soluble component fraction and a fraction of fiber material which comprises treating an oil seed mill residue with water in a ratio of about 1:1.5 to about 1:20 in a treatment zone maintained as a closed circulatory system and therein treating the oil seed mill residue by the steps of

(1) mashing the oil seed mill residue with a solution-suspension derived from subsequent treatment step (6);

(2) breaking down the mash resulting from step (1) by a fiber separation treatment into a fiber material fraction and a protein emulsion fraction at a pH of from 3–7;

(3) separating the resulting protein emulsion fraction from step (2) into a protein concentrate fraction and a first solution containing soluble components;

(4) washing out the resulting protein concentrate fraction from step (3) by passing said protein concentrate in counter-current flow contact with fresh water introduced into said treatment zone at the iso-electric point of the protein whereby there is formed a second solution containing soluble components and a protein fraction;

(5) separating the protein fraction resulting from step (4) at the iso-electric point of the protein and withdrawing the same from the treatment zone;

(6) washing the fiber material fraction obtained in step (2) by passing the same in counter-current flow contact with the second solution containing soluble components resulting from step (4) to thereby produce a solution-suspension and a fiber material fraction;

(7) separating the fiber material fraction resulting from step (6) and withdrawing the same from the treatment zone at a pH of from 3–7; and (8) re-cycling at least a portion of the solution-suspension from step (6) into said mashing step (1).

2. Process according to claim 1, which comprises withdrawing at least a portion of said first solution containing soluble components produced in step (3) from the treatment zone.

3. Process according to claim 1, which comprises effecting said mashing step (1) with a mixture of at least a portion of said first solution containing soluble components produced in step (2) and at least a portion of said solution suspension produced in step (6).

4. Process according to claim 1, which comprises effecting said mashing step (1) with a mixture of at least a portion of said first solution containing soluble components produced in step (2) and a portion of said solution-suspension produced in step (6), and combining the remaining portion of said solution-suspension with the protein emulsion fraction produced in step (3).

5. Process according to claim 1, which comprises subjecting said mash prior to the fiber separation treatment thereof in step (2) to a swelling treatment, vacuum-drying and grinding.

6. Process according to claim 1, which comprises pretreating said oil-seed-mill residue by addition thereto of an acid agent for a period of time sufficient to bring about a partial loosening of the fibers.

7. Process according to claim 1, which comprises pretreating said oil-seed-mill residue by addition thereto of antiseptic and antibiotic agents.

8. Process according to claim 1, which comprises using as starting oil seed mill residue an oil-seed rough grind still containing the solvent used in extracting the oil from the seed, using for removal of the solvent a member selected from the group consisting of the solution-suspension derived from step (6), first solution derived from step (3) and mixtures thereof, and separating the solvent from said group member by boiling under vacuum.

9. Process for producing a substantially pure protein by treatment of oil seed mill residues, which comprises treating an oil seed mill residue with water in a ratio of about 1:1.5 to about 1:20 in a treatment zone maintained as a closed circulatory system and therein treating the oil seed mill residue by the steps of
   (1) mashing the oil seed mill residue;
   (2) breaking down the mash resulting from step (1) by a fiber separation treatment into a fiber material fraction and a protein emulsion fraction at a pH of from 3–7;
   (3) separating the resulting protein emulsion fraction from step (2) into a protein concentrate fraction and a first solution containing soluble components;
   (4) washing out the resulting protein concentrate fraction from step (3) by passing said protein concentrate in counter-current flow contact with fresh water introduced into said treatment zone at the iso-electric point of the protein whereby there is formed a second solution containing soluble components and a protein fraction.

10. Process according to claim 1, which comprises carrying out said protein washing step (4) in the presence of an electrolyte selected from the group consisting of salt (NaCl), Glauber's salt and sodium acetate.

References Cited

UNITED STATES PATENTS

| | | | |
|---|---|---|---|
| 2,445,931 | 7/1948 | Beckel et al. | 260—412.4 |
| 2,297,685 | 10/1942 | Brier | 260—123.5 |

OTHER REFERENCES

Industrial and Engineering Chemistry, vol. 33, July 1946, pp. 731–734.

WILLIAM H. SHORT, *Primary Examiner.*

H. E. SCHAIN, *Assistant Examiner.*